3,454,563
PROCESS FOR THE MANUFACTURE OF 14β-HYDROXY-CARD-20(22)-ENOLIDES
Werner Fritsch, Neuenhain, Taunus, and Ulrich Stache and Werner Haede, Hofheim, Taunus, Germany, assignors to Farbwerke Hoechst Aktiengesellschaft vormals Meister Lucius & Bruning, Frankfurt am Main, Germany, a corporation of Germany
No Drawing. Filed Feb. 21, 1967, Ser. No. 617,483
Claims priority, application Germany, Apr. 27, 1966
F 49,021
Int. Cl. C07c *173/02*
U.S. Cl. 260—239.57                      1 Claim

ABSTRACT OF THE DISCLOSURE

Catalytic hydrogenation of 15α-bromo-14β-hydroxy-card-20(22)-enolides using a Raney nickel catalyst activated with palladium to form 14β-hydroxy-card-20(22)-enolides.

---

It is already known that 14β-hydroxy-card-20(22)-enolide is obtained by treating carda-14(15)-20(22)-dienolides with N-bromoacetamide, chromatographing the crude 15α-bromo-14β-hydroxy-card-20(22)-enolide, on aluminium oxide converting the 14,15β-oxido-card-20-(22)-enolide thus obtained by treatment with hydrogen chloride in chloroform into the 15α-chloro-14β-hydroxy-card-20(22)-enolide, and subsequently treating it with Raney-nickel in boiling ethanol. The total yield, however, amounts to only 7.5% by considering the 14,15β-oxido-card-20(22)-enolide which is recovered as primary product in the last phase of the process.

According to the present invention, a process for the manufacture of 14β-hydroxy-card-20(22)-enolides has been found, in which 15α-halogen-14β-hydroxy-card-20-(22)-enolides can be catalytically hydrogenated in the presence of noble metals at a pH of the reaction medium of 4.5–6.5.

The process of the present invention is carried out according to the following general reaction:

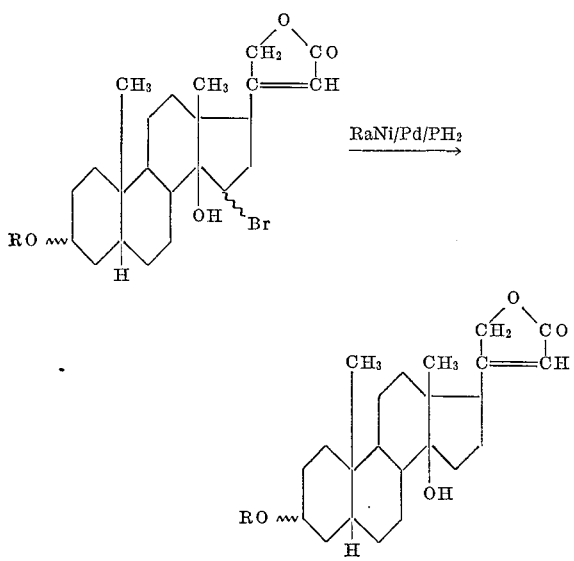

in which R is hydrogen, or, in the α- or β- position, a low molecular weight acyl radical of a mono- or di-carboxylic acid having at most 6 carbon atoms. As acyl radicals of monocarboxylic acids, formyl, acetyl, propionyl, or butyryl radicals can be used; as acyl radicals of dicarboxylic acids, the acyl radicals of malonic acid and, preferably, succinic acid can be used.

For preparing the initial materials, for example carda-14(15)-20(22)-dienolides (=Δ$^{α,β}$-β-(Δ$^{14}$-androstene-17-yl)-butenolide) can be used. These may have further substituents inert to halogen amides, for example acyloxy- or alkyl groups in the 1-, 2-, 4-, 6-, 7-, 11-, 12-, 16- or 17-position. These dienolides can be prepared, for example, by reacting 20-keto-21-hydroxy-(or acyloxy)-steroids with carbalkoxymethyl-dialkyl-phosphonates in the presence of anhydrous bases. The carda-14(15)-20(22)-dienolides are converted to the 14(15)-halohydrins, used as starting material, preferably to the corresponding bromohydrins, as described in Ch. R. Engel and G. Bach "Steroids," vol. 3, p. 593 (1964). For this process, N-halogenamides, preferably N-bromacetamide in dioxane, can be used in the presence of perchloric acid.

No further purification is necessary for the crude halohydrins thus obtained; they are immediately submitted to hydrogenation, whereby special conditions have to be observed for selective hydrogenation according to the process of the present invention. In particular, the reaction medium has to be maintained at pH 4.5 to 6.5.

The hydrogenation according to the present invention is carried out by means of a catalytically activated hydrogen. As catalysts noble metals are especially suitable, which metals are used either in fine suspension or on a carrier under normal conditions. Especially advantageous is the use of Raney-nickel activated with appropriate noble metals such as palladium. This catalyst is advantageously freed from excess alkali by first treating it with dilute weak acids such as acetic acid.

By continuously adding a buffer solution suitable for neutralizing hydrogen halide, for example sodium acetate/glacial acetic acid in methanol, the pH of the reaction mixture is kept at 4.5–6.5, preferably between 5 and 6, during hydrogenation. After absorption of 1 mol-equivalent of hydrogen, the hydrogenation stops. Those solvents usual for hydrogenation are used, for example lower alcohols, tetrahydrofurane, or dioxane, as well as mixtures thereof.

The process of the invention is quite surprising. Since it is known that the 20(22)-double bond in the lactone ring can be hydrogenated at normal pressure and at room temperature by means of Raney-nickel/H₂ on the one hand (Helv. chim. acta. 24, p. 716 (1941)), and by means of palladium/H₂ on the other hand (W. A. Jacobs and M. Heidelberger, J. Biol. Chemistry, vol. 54, p. 253 (1922)), it could not be expected that bromine could be split off hydrogenolytically by means of catalytically activated hydrogen from the 15-position without attacking the 20(22)-double bond, as is the case in the process of the present invention.

Furthermore, the process of the present invention is especially advantageous. It is known (Engel und Bach loc. cit., p. 622, line 10) that, when treating 15α-chloro-14β-hydroxy-card-20(22)-enolides by boiling in alcohol in the presence of Raney-nickel without further addition of hydrogen, 66% of the 15α hydrogen, halide is reconverted into the 14,15β-oxido-card-20(22)-enolide used in the process as the starting material and only 13.2% of the desired 14β-hydroxy-card-20(22)-enolides has been obtained. A yield of four and a half times the amount of that of hitherto known processes is obtained, i.e. an increase in yield of at least 450%, at the same time, 2 to 3 reaction steps are saved.

The products have valuable pharmacological properties, in particular inotropic and cardiovascular properties, as well as diuretic effects. They can also be used as intermedate products for the preparation of pharmaceuticals.

EXAMPLE 1

3α-acetoxy-14β-hydroxy-5β-card-20(22)-enolides (a) Preparation of the initial material.—To a solution of 465 mg. of 3α-acetoxy-5β-carda-14(15)-20(22)-dienolide (β-anhydro-epi-digitoxigenine-acetate) in 17.5 ml. of dioxane are added 290 mg. of newly recrystallized N-bromoacetamide and 1.19 ml. of a solution of 3.3 ml. 68.8% perchloric acid in 66 ml. of water. After stirring for a short period, the reaction mixture is allowed to stand in the dark for 1 hour. Then the whole is introduced, while stirring into 120 ml. of water containing a small amount of sodium bisulfite and acidified with a small amount of dilute hydrochloric acid.

(b) Hydrogenation.—The crude 15α-bromo-14β-hydroxy-card-20(22)-enolide is filtered off, thoroughly washed with water and dissolved, while wet, in 10 ml. of methylene chloride and added to a prehydrogenated suspension of 850 mg. of Raney-nickel/palladium-catalyst in 78 ml. of methanol and 1 ml. of water. After adding the solution of crude bromohydrin, catalytic hydrogenation is effected as usual. In this process, the pH value is maintained at 5.0 to 5.5 by continuous dropwise addition of a buffer solution prepared from 4.62 g. of sodium acetate containing water of crystallization, 4.00 ml. of glacial acetic acid and 23 ml. of methanol. After 4 to 6 hours, 1 mol-equivalent of hydrogen is absorbed. The hydrogenation has stopped. Then, the reaction mixture is filtered off from the catalyst, the filtrate is concentrated in vacuo to 10 ml. and introduced into water, while stirring. The precipitate is absorbed with methylene chloride. After washing with water and drying over sodium sulfate, the solution is evaporated in vacuum for drying and the residue is recrystallized from a small amount of acetone/hexane. 168 mg. of 3α-acetoxy-14β-hydroxy-5β-card-20(22)enolide melting point of 209°–210° C. (Kofler heater) are obtained.

(c) Preparation of the catalyst.—The catalyst is prepared as follows: 9.0 g. of Raney-nickel are stirred with 20 ml. of water for 5 minutes. The water is decanted and the catalyst is stirred for 30 minues by adding another 20 ml. of water and about 0.4 ml. of 2 N acetic acid. After this period the pH value of the aqueous phase should be 7.0 to 7.6. Subsequently a solution of 0. 8g. of palladium-dichloride dissolved in 150 ml. of water containing just so much dilute hydrochloric acid that the salt dissolves at the boiling temperature, is rapidly introduced, while stirring. The rate of addition is to be regulated such that the pH value does not fall below 3.1. The catalyst is filtered off with suction, thoroughly washed with water, and then treated three times by stirring with methanol and subsequently decanting. The catalyst, still moist with methanol, is subsequently pre-hydrogenated in an hydrogen atmosphere.

EXAMPLE 2

3β-acetoxy-14β-hydroxy-5β-card-20(22)-enolide (digitoxigenine-acetate)

(a) Preparation of the initial material.—To a solution of 698 mg. of 3β-acetoxy-5β-carda-14(15)-20(22)-dienolide (β-anhydro-digitoxigenine-acetate) in 26 ml. of dioxane are added 435 mg. of newly crystallized N-bromoacetamide and 1.79 ml. of a solution of 3.3 ml. of 68.8% perchloric acid in 66 ml. of water. After stirring for a short period, the reaction mixture is allowed to stand in the dark for 1 hour. Then the whole is introduced while stirring into 180 ml. of water containing a small amount of sodium bisulfite and acidified with a small amount of dilute hydrochloric acid.

(b) Hydrogenation.—The crude 15α-bromo-14β-hydroxy-card-20(22)-enolide is filtered off, thoroughly washed with water and dissolved, while moist, in 10 ml. of methylene chloride and added to a pre-hydrogenated suspension of 1.3 g. Raney-nickel/palladium-catalyst in 80 ml. of methanol and 1 ml. of water. (Preparation of the catalyst as described in Example 1). After adding the solution of crude bromohydrin, catalytic hydrogenation is effected under the same conditions as already described in the above-mentioned example. In this process, the pH-value of the reaction mixture is maintained at 5.5 to 5.8 my adding a buffer solution. After absorption of the calculated amount of hydrogen, which is completed after 4 hours, the catalyst is filtered off with suction, the filtrate is concentrated in vacuo to 10 ml. and introduced into water, while stirring. The precipitate is absorbed with methylene chloride. After washing with water and drying over sodium sulfate, the solution is evaporated in vacuo for drying and the residue is recrystallized from a small amount of methylene chloride/ether. 244 mg. of 3β-acetoxy-14β-hydroxy-5β-card-20(22)-enolide (digitoxigenine-acetate) melting point 217°–220° C. (Kofler heater) are obtained.

What we claim is:

1. A method for making 14β-hydroxy-card-20(22)-enolides which comprises catalytically hydrogenating corresponding 15α-bromo-14β-hydroxy-card-20(22)-enolides at a pH of 4.5 to 6.5 in the presence of a Raney nickel catalyst activated with palladium.

References Cited

UNITED STATES PATENTS 3,040,071   6/1962   Graham et al. _____ 260—397.45

ELBERT L. ROBERTS, *Primary Examiner.*